United States Patent [19]
Hirai

[11] Patent Number: 6,115,341
[45] Date of Patent: Sep. 5, 2000

[54] DIGITAL SIGNAL RECORDING METHOD AND APPARATUS AND DIGITAL SIGNAL REPRODUCTION METHOD AND APPARATUS

[75] Inventor: Jun Hirai, Tokyo, Japan

[73] Assignee: Sony Corporation, Tokyo, Japan

[21] Appl. No.: 09/020,691

[22] Filed: Feb. 9, 1998

[30] Foreign Application Priority Data

Feb. 17, 1997 [JP] Japan ..................................... 9-032424

[51] Int. Cl.[7] ....................................................... G11B 7/00
[52] U.S. Cl. .................................. 369/59; 369/60; 369/47
[58] Field of Search .................................. 369/59, 47, 48, 369/49, 50, 54, 58, 60; 360/48, 51, 53, 39, 5

[56] References Cited

U.S. PATENT DOCUMENTS 5,363,362  11/1994  Maeda et al. ........................... 369/59 X
5,915,069   6/1999  Nishijima ................................ 360/5 X

FOREIGN PATENT DOCUMENTS 0 487 294   5/1992  European Pat. Off. .
0 664 650   7/1995  European Pat. Off. .
0 689 354  12/1995  European Pat. Off. .
0 703 715   7/1996  European Pat. Off. .
0 720 365   7/1996  European Pat. Off. .

Primary Examiner—Muhammad Edun
Attorney, Agent, or Firm—Frommer Lawrence & Haug, LLP.; William S. Frommer

[57] ABSTRACT

The present invention enables to record and reproduce a digital signal in a high quality picture mode and in a long time mode with different compression rations on a single disc-shaped recording medium.

An output from a tuner 11 is supplied to a sound/data isolation circuit 12 where a video signal, an audio signal, and an accompanying data are isolated. The video signal is supplied via an A/D conversion circuit 14, a Y/C isolation circuit 15, a color demodulation circuit 16, a pre-filter 18, and a resampling circuit 19 to a compression circuit 20 where the video signal is compressed. The audio signal is supplied via an A/D conversion circuit 34, a pre-filter 38, and a resampling circuit 39 to a compression circuit 40 where the audio signal is compressed. Here, the compression ratio is switched by a control signal which specifies the high quality picture/long time mode. The compressed video signal, the compressed audio signal, and the accompanying data is combined into a serial data by a multiplex circuit 41 and via a FIFO memory 42 recorded on a disc-shaped recording medium 100. During a reproduction, the video signal and the audio signal are outputted according to the aforementioned procedure reversed.

19 Claims, 12 Drawing Sheets

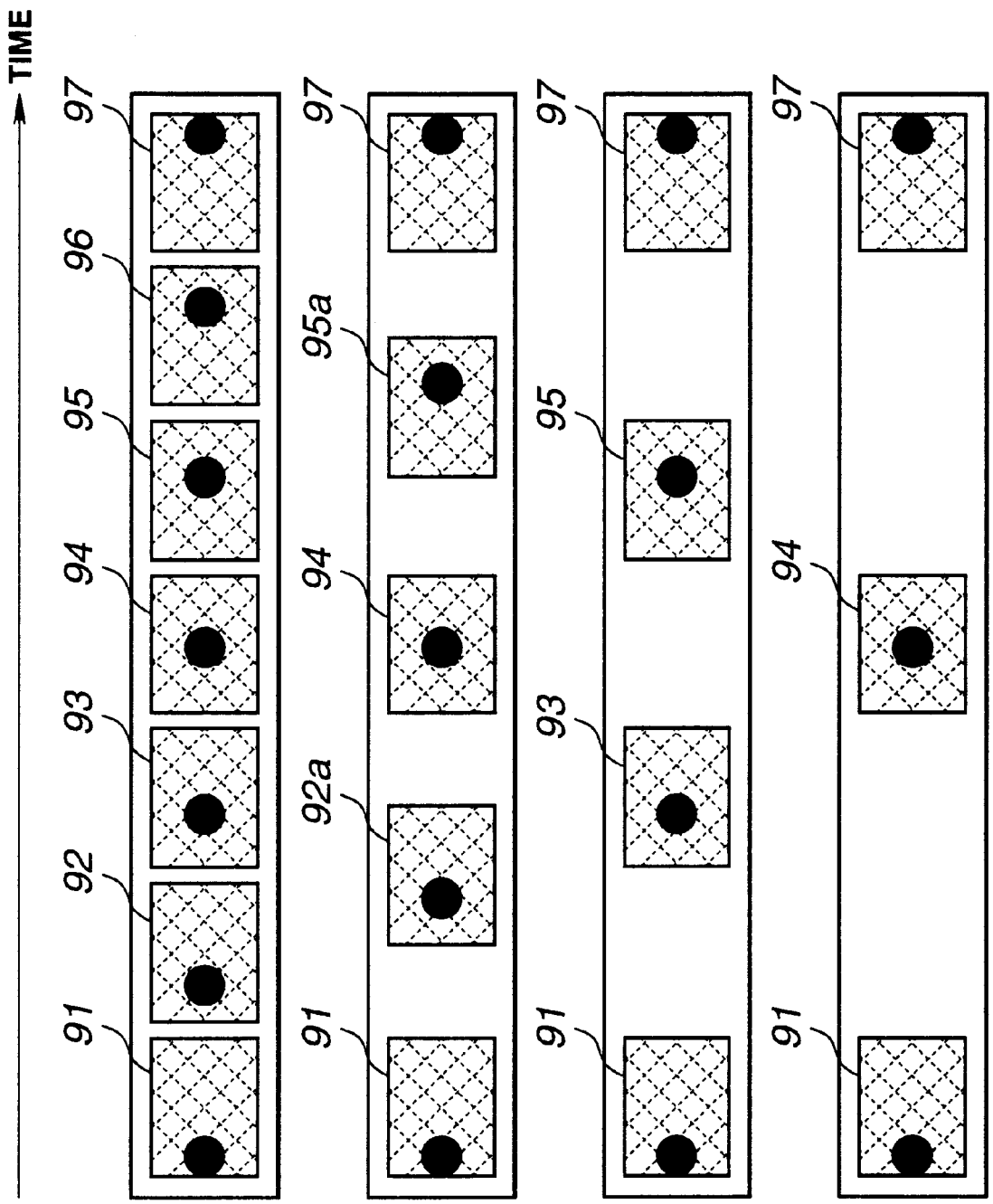

DIGITAL SIGNAL RECORDING METHOD AND APPARATUS AND DIGITAL SIGNAL REPRODUCTION METHOD AND APPARATUS

BACKGROUND OF THE INVENTION

1. Field of the Invention

The present invention relates to a method and an apparatus for recording/reproducing a digital signal onto/from a recording medium and in particular, to a digital signal recording method and apparatus and a digital signal reproduction method and apparatus for recording/reproducing a digital video signal onto/from a disc-shaped recording medium with compression of the digital video signal.

2. Description of the Prior Art

A video tape recorder (VTR) using a magnetic tape is used as means for recording/reproducing a video signal and an audio signal onto/from a recording medium. A home VTR normally can be switched between a standard mode and a long time (for examples, three times longer) mode so as to select a time which can be used for recording a video signal onto a predetermined length of a magnetic tape. When recording a television program which can be recorded within a time of standard mode, the user normally selects the standard mode which enables to obtain a preferable picture quality. The long-time mode is normally selected when the user desires to record on a single magnetic tape a long time program which exceeds the length of the magnetic tape if at the standard mode or when the user desires to record various programs on a single magnetic tape.

On the other hand, an optical disc or the like has been widely spread as a medium capable of recording/reproducing a video signal and an audio signal as digital signals. When compared to a magnetic tape, a disc-shaped recording medium is superior in the random access capability and is capable of recording/reproducing a high quality picture, but cannot be selected between modes which correspond to the aforementioned standard mode and the long-time mode.

SUMMARY OF THE INVENTION

It is therefore and object of the present invention to provide a digital signal recording method and apparatus and a digital signal reproduction method and apparatus which enable to use a disc-shaped recording medium capable of recording a digital video signal and the like, in two modes, i.e., a high quality mode and a long time mode which correspond to the aforementioned standard mode and the long time mode in the VTR.

In order to achieve the aforementioned object, the present invention provides a digital signal recording method for compressing a digital signal and recording the compressed digital signal on a recording medium capable of random access. The digital signal recording method according to the present invention includes: a step of compression for compressing a digital signal inputted; a step of accumulation for accumulating the digital signal compressed in a memory; and a step of recording for recording the digital signal accumulated on a recording area of the recording medium.

Moreover, the digital signal recording apparatus according to the present invention includes: compression means for compressing a digital signal with a compression ratio specified by a control signal, i.e., selected from a plurality of compression ratios; a memory for accumulating a digital signal compressed; and recording means for recording for recording on a recording area specified according to the aforementioned specified compression ratio.

In the aforementioned digital signal recording method and apparatus, it is possible to record a digital signal such as a video signal on a single recording medium at a high quality mode and a long time mode which differ in compression ratios.

Moreover, the present invention provides a digital signal reproduction method for reproducing a compressed digital signal recorded on a recording medium capable of random access. The digital signal reproduction method according to the present invention includes: a read-out step for reading out digital signals compressed with different compression ratios from different recording areas of the recording medium; an accumulation step for accumulating in a memory the digital signals which have been read out; and a decoding step for decoding the digital signals accumulated.

Moreover, the digital signal reproduction apparatus according to the present invention includes: read-out means for reading out digital signals compressed with different compression ratios from different recording areas of a recording medium capable of random access; a memory for accumulating digital signals which have been read out; and decoding means for decoding the digital signals accumulated.

In the aforementioned digital signal reproduction method and apparatus, it is possible to reproduce digital signals recorded with different compression ratios on a single disc-shaped recording medium and to carry out a processing to reduce a block distortion according to the compression ratios, enabling to reproduce with a practical picture quality a video signal which has been recorded at the long time mode with a higher compression ratio.

BRIEF DESCRIPTION OF THE DRAWINGS

FIGS. 9A–9D schematically shows a method for changing the compression ratio by changing the number of frames per a unit time.

DETAILED DESCRIPTION OF THE PREFERRED EMBODIMENTS

Description will now be directed to preferred embodiments of the present invention with reference to the attached drawings. Firstly, a configuration example of a digital signal recording apparatus will be explained and with reference to the configuration, a digital signal recording method will be explained. Next, explanation will be given on a digital signal reproduction apparatus which corresponds to the aforementioned configuration example of the digital signal recording apparatus and, with reference to this configuration, on a digital signal reproduction method.

Figure 1:
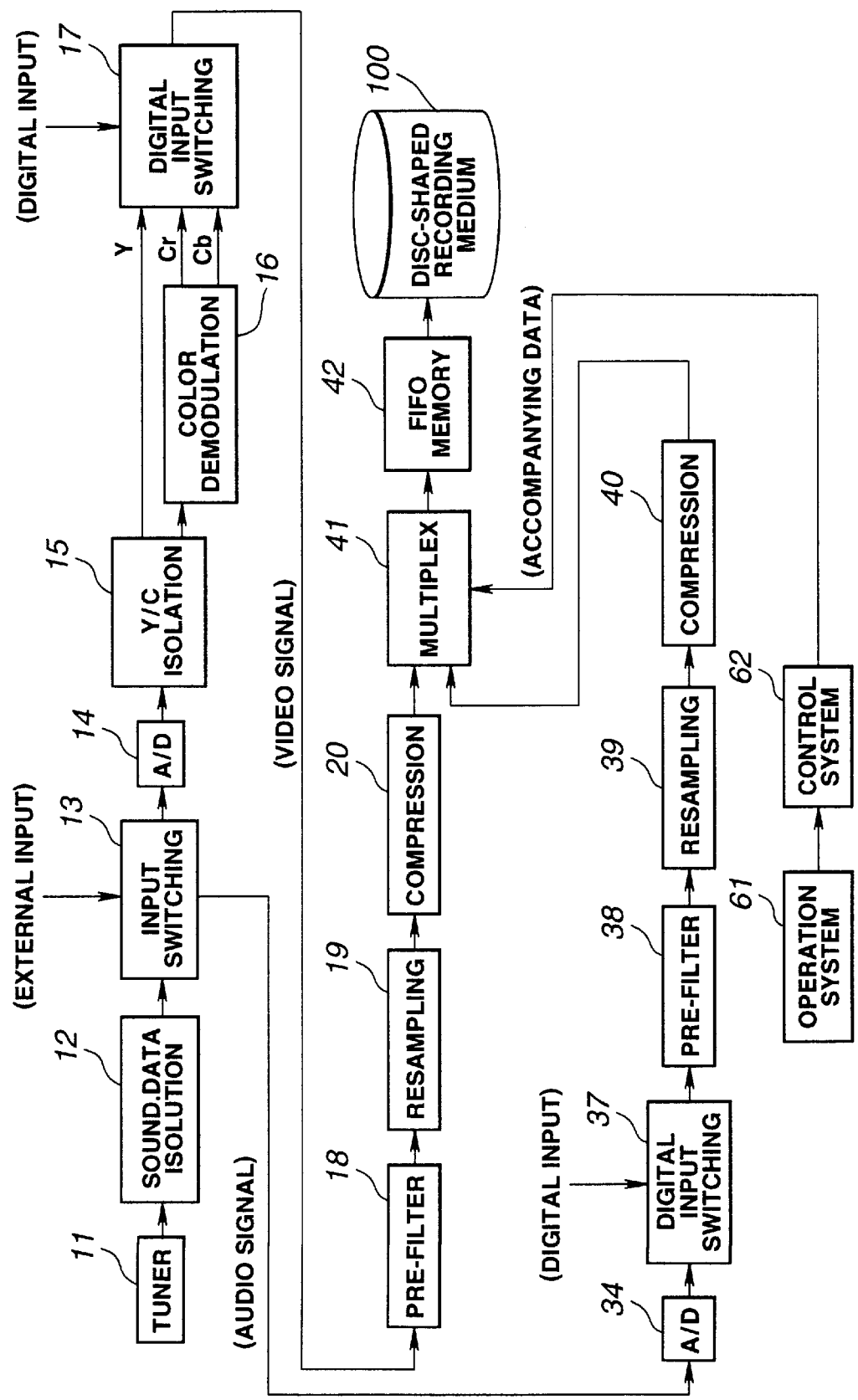
FIG. 1 is a block diagram showing a configuration of a digital signal recording apparatus according to an embodiment of the present invention.

FIG. 1 is a block diagram showing a configuration example of a digital signal recording apparatus according to an embodiment of the present invention. This digital signal recording apparatus records as a digital signal on a disc-shaped recording medium 100, a television broadcast program received by a tuner 11, a signal inputted from an external apparatus, and the like. It is possible to record a video signal and an audio signal on this disc-shaped recording medium 100 at any one of two recording modes, i.e., a high quality picture mode which lays stress on the picture quality admitting a short time of recording and a long time mode which lays stress on a long recording time admitting a lowered picture quality. These recording modes will be detailed later.

Hereinafter, explanation will be given on the components and operation of this digital signal recording apparatus with reference to FIG. 1.

The tuner 11 is used for selecting and receiving a television broadcast and isolates and demodulates for output an analog video signal, an analog audio signal and an accompanying data used for various controls. Operation of this tuner 11 is controlled by an operation system 61, a control system 62, and a reservation information from a timer (not depicted).

In a sound/data isolation block 12, the analog video signal, the analog video signal, and the accompanying data outputted from the tuner 11 are isolated from one another. The analog video signal is supplied via an input switching circuit 13 to an A/D converter 14. The analog audio signal is supplied to an A/D converter 34. The accompanying data outputted from the tuner 11 are control signals such as an audio signal mono/stereo decision signal and an EDTV decision signal which are supplied to a control system 62 for use in the high picture quality/long time mode decision and switching will be detailed later.

The input switching circuit 13 is used to switch between an analog signal from the tuner 11 and an external input signal inputted from an external apparatus such as a satellite broadcast (BS) tuner. It should be noted that when the external signal from a BS tuner is selected, a control signal simultaneously inputted as an accompanying data controls this digital signal recording apparatus to carry out recording operation at the high quality picture mode.

The A/D converter 14 converts an analog video signal from the input switching circuit 13, into a video signal.

In a Y/C isolation circuit 15, a luminance (Y) signal and a color (C) signal of the digital video signal are isolated. Moreover, in a color demodulation circuit 16, two color difference signals Cr and Cb are demodulated from the isolated C signal. Among the three primary colors, this Cr is a signal of a red (R) signal component deleted by the Y signal, and the Cb is a blue (B) signal component deleted by the Y signal.

A digital input switching circuit 17 carries out switching between the Y signal from the Y/C isolation circuit 15 and two color difference signals Cr and Cb from the color demodulation circuit 16, and an external digital input signal such as a high quality picture broadcast. When a data on a picture quality and a sound quality is inputted as an accompanying data together with the aforementioned digital input signal, the (data is used in the high quality picture/long time mode decision in the control system 62. The digital video signal selected here is transmitted to a pre-filter 18.

The pre-filter 18 together with a resampling circuit 19 and a compression circuit 20 constitute main components of compression means for compressing a digital video signal to be recorded on the disc-shaped recording medium 100.

According to a high quality picture/long time mode control signal from the control system 62, the pre-filter 18 limits the digital video signal to a predetermined value of frequency band. This limit of the frequency band is carried out by reducing signal components of the video signal from a higher frequency side.

According to a result of the aforementioned high quality picture/long time mode decision, a sampling rate is selected in the resampling circuit 19.

In the compression circuit 20, the digital video signal from the resampling circuit 19 is compressed with a predetermined compression ratio according to the high quality picture/long time mode for supply to a multiplex circuit 41. The compression method used here may be MPEG (Moving Picture Experts Group) 1, MPEG 2, or the like. Moreover, parameter switching for compression rate control and the like is carried out by a high quality picture/long time mode switching signal fed from the control system 62. A circuit configuration for carrying out compression at a variable rate will be detailed later with reference to FIG. 2.

On the other hand, the audio signal from the input switching circuit 13 is converted into a digital audio signal by the A/D converter 34. A digital switching circuit 37 carries out switching between the digital audio signal and an external digital input signal, which is supplied via pre-filter 38, a resampling circuit 39, and a compression circuit 40 to the multiplex circuit 41. It should be noted that in each of these circuits, parameters are switched according to the high quality picture/long time node switching signal fed from the control system 62 in the same was as for the video signal.

In the multiplex circuit 41, the digital video data from the compression circuit 20, the digital audio data from the compression circuit 40, and the accompanying data, i.e., a control signal indicating the high quality picture/long tine mode fed from the control system 62 are converted into a serial data for supply to an FIFO (Fast In Fast Out) memory 42.

The FIFO memory 42 is a memory for accumulating digital signals compressed and accumulates a serial data from the multiplex circuit 41. The data accumulated in the FIFO memory 42 is read out in accordance with a transfer rate to the disc-shaped recording medium 100 and recorded on the disc-shaped medium 100 by predetermined recording means. It should be noted that this recording means is identical to a conventional one and its explanation will be omitted.

The control system 62 carries out control such as a channel selection of the tuner 11 according to an instruction inputted from the operation system 61 and a reservation information specified in advance.

In the aforementioned digital signal recording apparatus, it is possible to carry out recording in the high quality picture mode or in the long time mode. Here, the high quality picture mode is for recording with a lower compression ratio in order to lay stress on the picture quality admitting that the recording time per recording medium becomes shorter. On the other hand, the long time mode is for recording with a higher compression ratio in order to lay stress on the recording time admitting that the picture quality is lowered. Here, it is assumed to carry out a variable rate recording that in the high quality picture mode, recording is carried out with a fixed rate using a constant compression ratio, whereas in the long time mode, recording is carried out by switching the compression ratio (recording bit rate).

Moreover, in this embodiment of the present invention, it is assumed that the number of pixels of the video signal is, for example, 704×480 pixels (60 fields/second) in the high quality picture mode and 352×240 pixels (30 frames/second) in the long time mode. These numbers are based on the existing video signal specifications. The former is based on the ITU-R601 (ITU-R: International Telecommunication Union-Radiocommunication Sector), and the latter is based on the SIF (Source Input Format) which is employed as specifications of a disc-shaped recording medium and the like using MPEG1 and called video CD.

In the present embodiment, the number of pixels can be other than the aforementioned, but if the number of pixels in the high quality picture mode is equal to the number of pixels in the long time mode multiplied by an integer, it is possible to use a simple circuit configuration.

In the high quality picture mode, it is assumed that the sampling frequency of the luminance (Y) signal of the video signal is 13.5 MHz and the sampling frequency of the two color difference signals Cr and Cb are respectively 6.75 MHz. Such a video signal is called a 4:2:2 video signal because of its sampling frequency ratio. On the other hand, in the aforementioned long time mode, it is assumed that the luminance (Y) signal of the video signal has a sampling frequency of 13.5 MHz which identical to the frequency in the high quality picture mode, and in the scanning lines of odd number, the sampling frequency of Cr is 6.75 MHz, and in the scanning lines of even numbers, the sampling frequency of Cb is 6.75 MHz. Such a video signal is called 4:1:0.

As for the audio signal, 20 kHz is assumed as the sampling frequency of a high quality sound mode which corresponds to the high quality picture mode, and 12 kHz is assumed in the long time mode.

It should be noted that by limiting an input frequency band prior to compression of a video signal, it is possible to reduce picture quality deterioration due to block distortion and mosquito noise which may appear in an output whose bit rate is limited. It is known that such a picture quality deterioration is easily caused during compression using the DCT (Discrete Cosine Transform).

For example, in the high quality picture mode, the aforementioned 4:2:2 video signal is limited to the maximum frequency of 6 MHz in the Y signal and the maximum frequency of 3 MHz in each of the two color difference signals Cr and Cb. On the other hand, in the long time mode, the 4:1:0 video signal is limited to the maximum frequency of 3 MHz in the Y signal and to the maximum frequency of 1.5 MHz in each of the two color difference signals Cr and Cb.

Considering the aforementioned input signal characteristics, it is assumed that the compression ratio of the video signal is 6 Mbps in the high quality picture mode and 1 Mbps in the long time mode. Moreover, the compression ratio of the audio signal is 128 kbps in the high quality picture mode and 64 kbps in the long time mode.

Switching between the high quality picture mode and the long time mode is normally carried out manually by the user through the operation system 61, but it is also possible that the digital signal recording apparatus recognizes contents of a program to be recorded and automatically selects the mode. When a data indicating a category of the broadcast program is transmitted as an accompanying data, this category data is recognized to carry out the mode switching. For example, if a program to be recorded is a movie, the high quality picture mode is selected and if the program is a wide show, the long time mode is selected. It is also possible to store this mode setting in a timer (not depicted) or the like in the control system 2, and a series of programs which is broadcast every day or every week is recorded in the same mode unless the user changes the mode.

Moreover, in a case when the digital input switching circuit 17 and 37 are supplied from an external apparatus or the like with a digital input which is a high quality video signal and audio signal such as a high quality picture broadcast, recording is carried out in the high quality picture mode. Here, the aforementioned high quality picture broadcast assumes the High-vision (HDTV) which is a Japanese method of high resolution television, a so-called Clear-vision broadcast (EDTV) which uses the number of scanning lines identical to the current television broadcast based on the NTSC method, a broadcast based on video signal specifications such as PAL+ employed outside Japan, and various digital broadcasts and the like.

Next, description will be directed to a configuration used when carrying out a variable rate recording in the digital signal recording apparatus of FIG. 1. As has been described above, in this digital signal recording apparatus, the long time mode carries out the variable rate recording.

Figure 2:
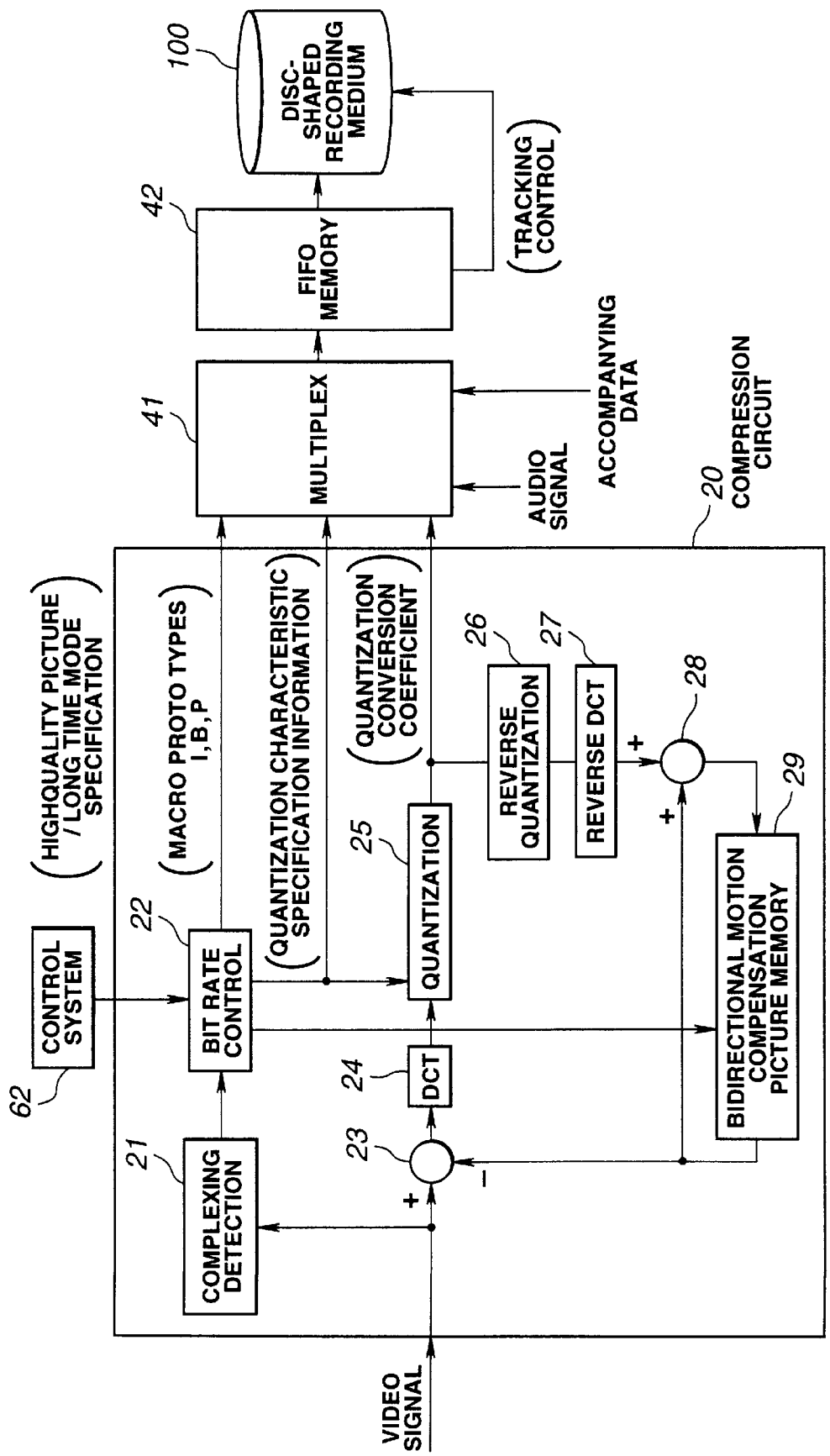
FIG. 2 is a block diagram showing a configuration example of a compression circuit 20 used for recording at a variable bit rate.

FIG. 2 is a block diagram showing a configuration example of the compression circuit 20 assuming to carry out the variable rate recording in the digital signal recording apparatus of FIG. 1. This compression circuit 20 is for compressing a video signal using a compression method such as the aforementioned MPEG or the like and further includes a function to change the recording bit rate according to a control signal fed from the control system 62 for specifying the high quality picture/long time mode to switch the compression ratio. Note that the method for changing the recording bit rate will be detailed later.

The digital video signal from the resampling circuit 19 is supplied via a differential circuit 23 to a DCT circuit 24 and subjected to DCT (discrete cosine transform) which is a type of the orthogonal conversion, so as to be dissolved into frequency components.

In a quantization block 25, the video signal which has been subjected to DCT in the DCT block 24 is quantized and compressed by removing a higher frequency term of the aforementioned frequency components. More specifically, each of the pixel values constituting a picture is divided by a divider of a certain value (quantization step) and a remainder is rounded. The rounded remainder will not be restored when the quantization step is multiplied during elongation-reproduction, thus realizing compression. In order to increase a compression ratio, it is necessary to increase the quantization step of the aforementioned divider. That is, if the quantization step is increased, most part of the higher frequency term becomes zero and the compression ratio is increased. A quantization conversion coefficient of the video signal quantized in the quantization block is transmitted to the multiplex circuit 41 and to a reverse quantization block 26.

In the reverse quantization block 26, a reverse quantization is carried out according to a reversed procedure of the quantization in the quantization block. The quantization conversion coefficient which has been subjected to the reverse quantization is supplied to a reverse DCT block 27 and subjected to a reversed DCT (reverse discrete cosine transform) according to a reversed procedure of the DCT in the DCT block 24.

An output from the reverse DCT block 27 is stored via an adder circuit 28 in a bidirectional motion compensation picture memory 29. An output from this bidirectional motion compensation picture memory 29 is returned to the adder circuit 28 to be added to an output from the aforementioned reverse DCT block 27, and the addition result is fetched again by the bidirectional motion compensation picture memory 29. an output of the bidirectional motion compensation picture memory 29 is also supplied as an inversion input to the aforementioned differential circuit 23 so as to create a difference from the digital video signal. This difference is the aforementioned digital video signal which is transmitted to the DCT block 24.

In this configuration, only a changed portion compared to a preceding picture is detected for carrying out compression and it is possible to effectively carry out motion picture compression.

As for the digital video signal from the resampling circuit 19, its complexity is detected by a complexity detecting circuit 21 which is complexity detecting means. The most simple method to detect a complexity of a video signal is realized by detecting a quantity of a higher frequency component in a horizontal direction and vertical direction contained in the video signal. That is, a complexity of a video signal is determined according to the fact that a complicated picture having a plenty of fine parts contains more higher frequency components and a simple picture having small changes contains less higher frequency components.

A detection result of the complexity is supplied to a bit rate control block 22, where the recording bit rate (i.e., compression ratio) is switched to the high quality picture mode or the long time mode specified by a control signal from the control system 62. The variable rate recording according to this recording bit rate will be detailed later. The bit rate control block 22 creates macro block types called I (Intra) picture, B (Bidirectionally predictive) picture, and P (Predictive) picture which are processed in different ways. These macro block types are supplied to the multiplex circuit 41. The control output of the recording bit rate is supplied to the quantization block 25 which will be detailed later and also supplied, as a quantization characteristic specification information to the multiplex block 41.

In the multiplex circuit 41, the aforementioned I, N, P macro block types, the quantization characteristic specification information, and the quantization conversion coefficient, as well as the audio data and an accompanying data such as various control signals are converted into a serial data and transmitted to the FIFO memory 42.

The serial data accumulated in the FIFO memory 42, while carrying out tracking control of a recording head with respect to the disc-shaped recording medium 100, is read out according to the transfer rate so as to be recorded on the disc-shaped recording medium 100.

Figure 3:
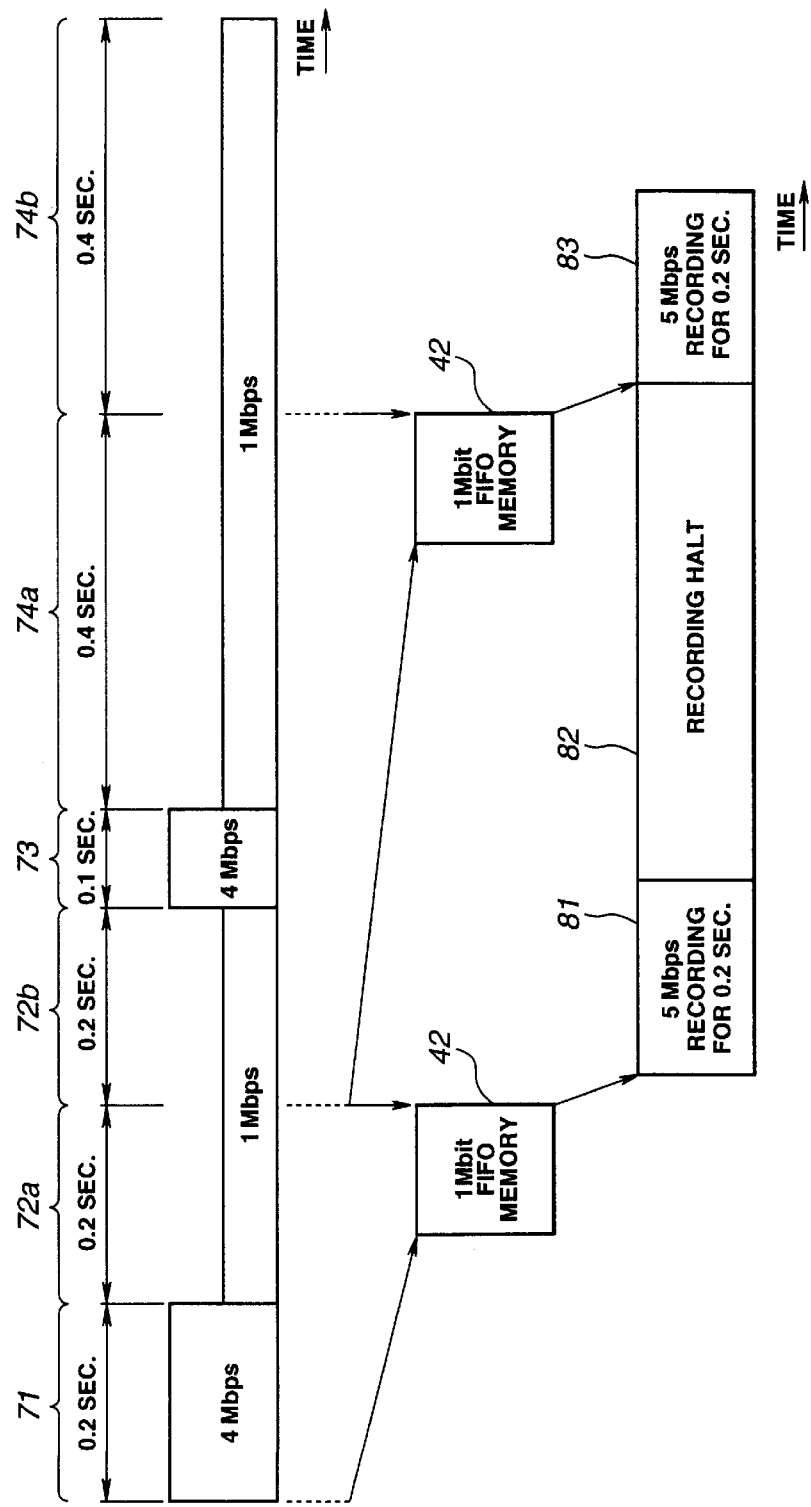
FIGS. 3A and 3B explains a recording operation with the variable recording bit rate.

FIG. 3 is a diagram for explanation of operation of the variable bit rate recording of the video signal by the compression circuit 20 shown in FIG. 2.

As has been described above, in the present embodiment, in the long time mode, a variable bit rate recording is carried out by changing the compression ratio according to the complexity of the video signal. The recording bit rate of a video signal assumes, for example, a 4 Mbps data for a complicated picture and a 1 Mbps data for a simple picture for every 0.1 seconds.

In order to carry out this variable rate recording, it is necessary to assure a sufficient transfer rate for carrying out a high quality picture mode recording of the maximum recording bit rate. For this, the rotation velocity of the disc-shaped recording medium 100 is set to a mode identical to the high quality picture mode and a video signal is recorded for each of the sectors. When the video signal accumulated in the FIFO memory 42 has become less than for one sector, the aforementioned recording operation is halted not to advance the tracking control. The tracking control is resumed when the video signal accumulated in the FIFO memory 42 becomes equal to or more than for one sector, so that recording operation is carried out in the next sector.

The aforementioned recording operation will now be explained assuming video signals compressed by the compression circuit 20 are successively outputted as shown in FIG. 3A. That is, a video signal 71 is outputted at 4 Mbps for 0.2 seconds; a video signal 72a and video signal 72b are outputted at 1 Mbps for a total of 0.4 seconds; a video signal 73 is outputted at 4 Mbps for 0.1 second; and video signals 74a and 74b are outputted at 1 Mbps for a total of 0.8 second. This compressed video signal is temporarily stored via the multiplex circuit 41 in the FIFO memory 42. If this FIFO memory has a capacity of 1 Mbit, at the moment when the compressed video signal of 1 M bit is accumulated in the FIFO memory, the accumulated signal is read out and transferred to the disc-shaped recording medium 100, completing one recording operation.

FIG. 3B shows this recording operation. In this example, 5 Mbps is assumed as the recording rate to the disc-shaped recording medium 100, and the operation of recording the 1 Mbit video signal from the FIFO memory 42 is complete in 0.2 seconds. That is, in the first one recording operation 81, the video signal 71 of 4 Mbps for 0.2 seconds and the video signal 72a of 1 Mbps for 0.2 seconds are transferred to be recorded onto the disc-shaped recording medium 100. When this recording operation is complete, the recording operation is halted as shown by the recording halt time 82 in the figure. The next recording operation 83 is started when another 1 Mbit video signal is accumulated in the FIFO memory 42. In this recording operation 83, the video signal 72 of 1 Mbps for 0.2 seconds, the video signal 73 of 4 Mbps for 0.1 second, and the video signal 74a of 1 Mbps for 0.4 seconds are transferred to be recorded onto the disc-shaped recording medium 100.

If the disc-shaped recording medium 100 is an optical disc, tracking of an optical pickup (head) is terminated at the moment when one recording operation is complete. And at the moment when a 1 Mbit video data is accumulated in the FIFO memory 42, the tracking of the optical pickup is started for carrying out recording operation. Consequently, the recording halt time 82 is decreased if video signals of complicated pictures are successively outputted and the recording halt time 82 is increased if video signals of simple pictures are successively outputted. Thus, the recording bit rate is averaged, carrying out a variable rate recording. It should be noted that if the input signal specification is SIF (Source Input Format), it is possible to make the maximum recording bit rate comparatively large, i.e., 4 Mbps, enabling to reduce deterioration of the picture.

In the long time mode, the aforementioned variable rate recording is carried out and in the high quality picture mode, fixed rate recording is carried out. Switching between the high quality picture/long time modes is carried out by a mode switching instruction transmitted from the control system 62 to the bit rate control circuit 22.

In a case when one or two programs can be recorded on a single disc-shaped recording medium 100, if a variable rate recording is carried out in the high quality picture mode, a target program may not be recorded continuously because the recording time is changed. However, in the long time mode, a variable rate recording enables to record many programs on the disc-shaped recording medium 100 ad the entire recording time is not greatly changed although the respective program recording time values may be changed. As this long time mode is for recording a plenty of programs, it is rather preferable that the recording bit rate can be lowered by the variable rate recording.

It should be noted that in the present embodiment, the variable recording bit rate is used only in the long time mode and the fixed bit rate is used in the high quality picture mode. However, it is also possible to carry out the variable rate recording in the high quality picture mode. In such a case, the transfer rate of the video signal to the disc-shaped recording medium 100 is made greater than the aforementioned 5 Mbps (for example 8 Mbps), and the average transfer rate is made to be 5 Mbps while accumulating the video signal in the FIFO memory 42, thus enabling to carry out recording/reproduction of further higher quality picture.

Figure 4:
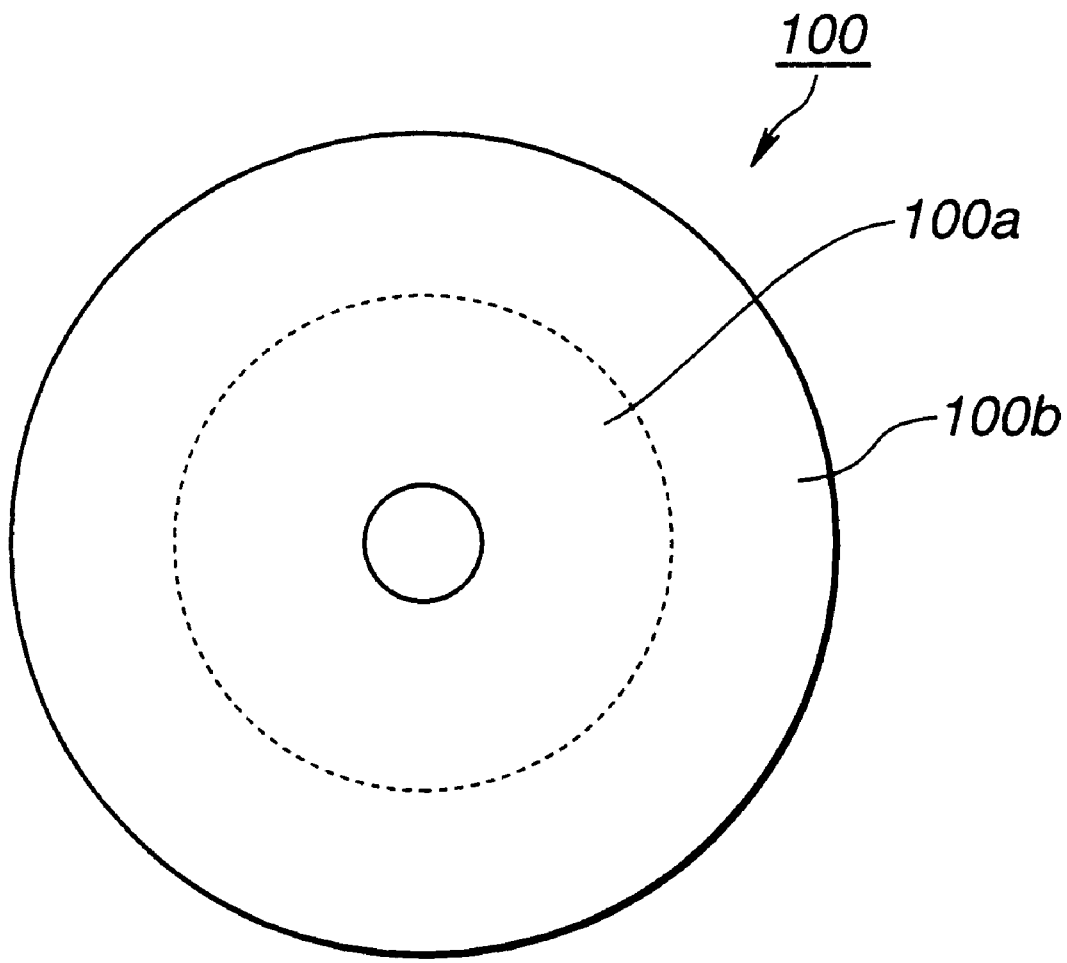
FIG. 4 shows an example of recording area allocation when recording a video signal on a single disc-shaped recording medium in a high quality picture mode and in a long time mode.

FIG. 4 shows an example of recording area arrangement when recording a compressed digital signal in the high quality picture mode and a compressed digital signal in the long time mode.

In a case when the disc-shaped recording medium 100 is an optical disc, a relative velocity (linear velocity) between the head and the disc is controlled to be constant. A digital signal of the high quality picture mode is recorded at a relative velocity 2 m/s in a recording area 100b provided on the outer circumferential side of the disc-shaped recording medium, starting at the outermost circumference. On the other hand, a digital signal of the long time mode is recorded at a relative velocity of 1 m/s from in a recording area 100a provided on the inner circumferential side of the disc-shaped recording medium 100, starting at the innermost circumference. If the recording areas are allocated thus on the disc-shaped recording medium 100, it is possible to minimize the change of the number of rotations to control to obtain a constant relative velocity for the respective recording modes. As a result, it is possible to reduce the load on a spindle servo driving to rotate the disc-shaped recording medium 100 as well as to reduce a recording signal retrieval time.

Moreover, in a case when the disc-shaped recording medium 100 is a magnetic disc (hard disc), the disc-shaped recording medium 100 is normally driven at a constant number of rotations. If the recording areas arranged on the hard disc in the same way as in the aforementioned optical disc, a video signal of the long time mode having a greater compression ratio (greater transfer rate) is recorded on the disc inner circumeferential side whether the relative velocity between the head and the disc is lowered and accordingly, it is possible to substantially increase the transfer rate of the signal recorded on the inner circumferential side, which enables to reduce load of hardware such as reducing the size of a cache memory used for making constant the transfer rate to outside.

Next, description will be directed to a method for changing the compression ratio of a video signal in the present embodiment.

Figure 5:
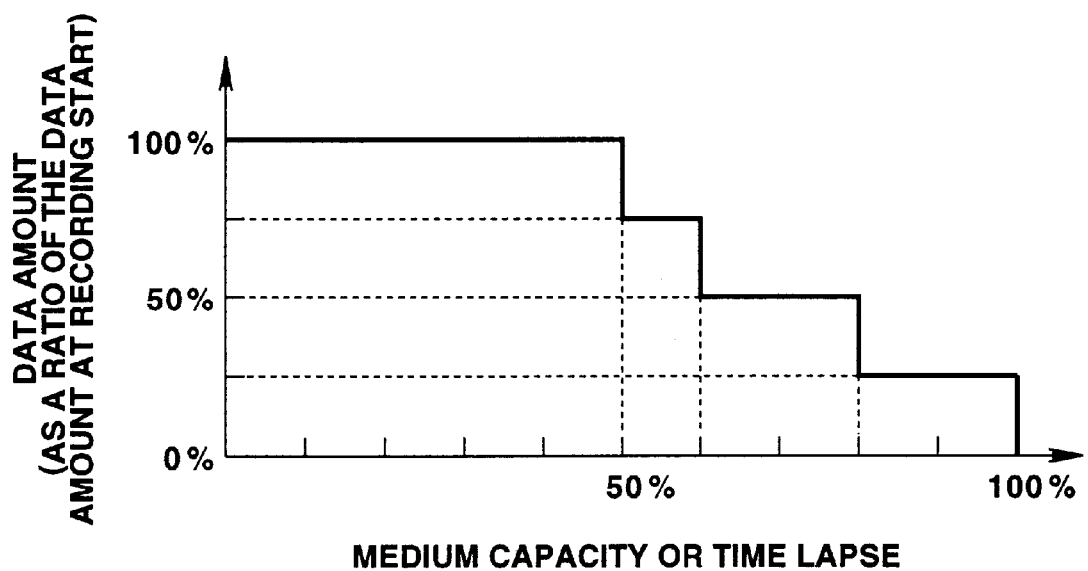
FIG. 5 shows a stepped switching of the recording bit rate with respect to the used capacity of a recording medium.

FIG. 5 shows that the compression ratio is switched from one to another according to the empty capacity (remaining recordable capacity) of the recording medium and the recording time lapse. It is also possible to continuously change the compression ratio, but it is more practical to change in a stepped way as shown in FIG. 5. In the digital signal recording method and the digital signal recording apparatus using the high quality picture mode and the long time mode according to the present embodiment, the compression ratio is switched between two steps. Here, the horizontal axis represents a capacity of the recording medium 100 as a ration with respect to the capacity at the recording start and the vertical axis represents a signal data amount recorded on the recording medium 100 as a ratio with respect to the data amount at the recording start.

That is, when the medium capacity is reduced to 50% compared to the capacity at the recording start, a video signal, audio signal, and the like to be recorded on the recording medium 100 are controlled so that a data amount is compressed to 75% compared to the data amount at the recording start. After this, at the moment when the empty capacity of the recording medium 100 has become 40% of the capacity at the recording start, the compression ratio is increased so that a signal data amount to be recorded on the recording medium 100 is compressed to 50% compared to the recording start. Furthermore, when the empty capacity of the recording medium 100 has become 20% of the capacity at the recording start, the compression ratio is controlled to be increased so that a signal data amount to be recorded on the recording medium 100 is compressed to 25% of that at the recording start.

Switching of the compression ratio can be realized by a method of limiting a frequency band of an input signal; a method of switching a sampling frequency of an input signal; a method of frame discarding, and the like. Furthermore, it is possible to carry out zone encoding, changing characteristic of a reproduction filter in the digital signal reproduction apparatus, and other various methods. Hereinafter, explanation will be given on several methods for compression ratio switching.

FIG. 6 shows a method of changing the frequency band of a signal to be compressed for changing the compression ratio.

Figure 6A:
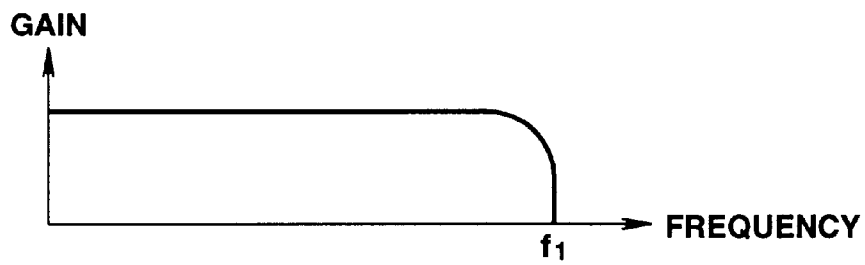
FIGS. 6A–6D schematically shows a method for changing the compression ratio by limiting the frequency band of a signal to be compressed and recorded.
Figure 6B:
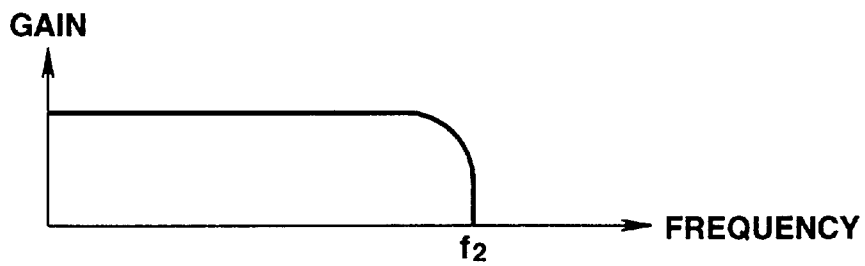
Figure 6C:
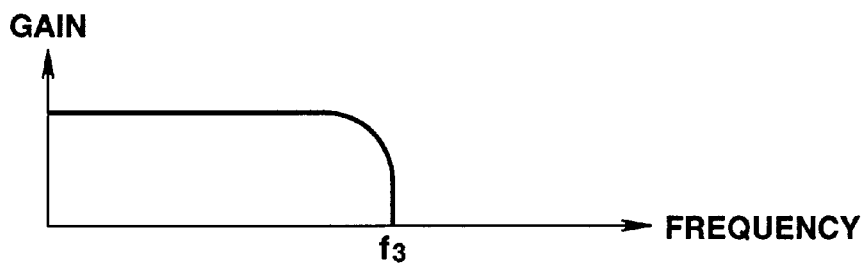
Figure 6D:
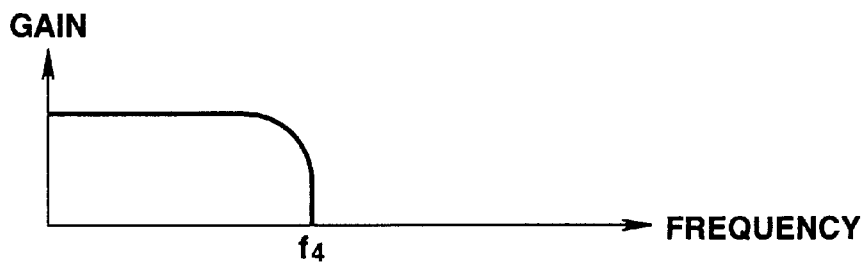
Figure 7A:
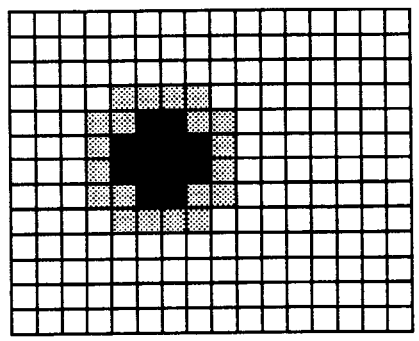
FIGS. 7A–7D schematically shows a method for changing the compression ratio by changing the number of blocks constituting a screen, i.e., the resolution.
Figure 7B:
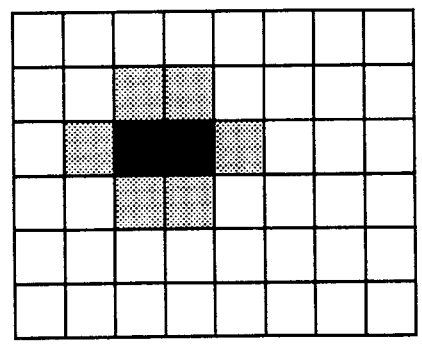
Figure 7C:
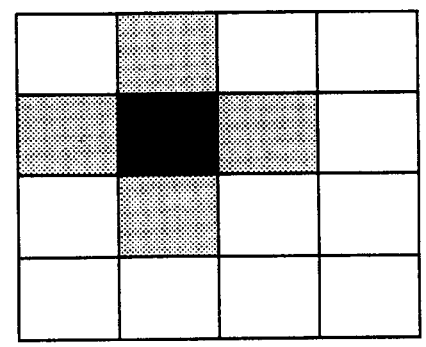
Figure 7D:
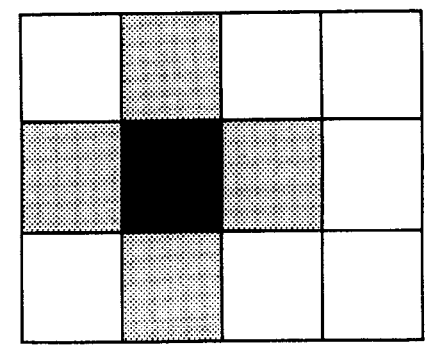
Figure 8A:
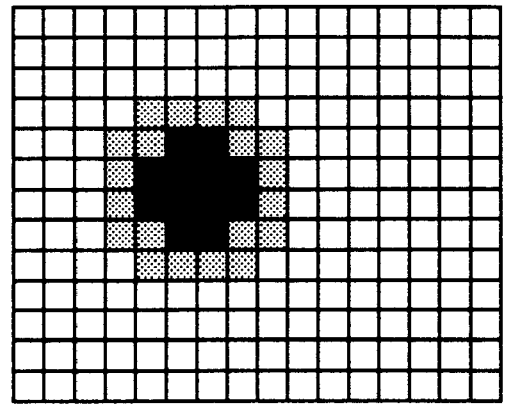
FIGS. 8A–8D schematically shows a method for changing the compression ratio by changing the size of a picture.
Figure 8B:
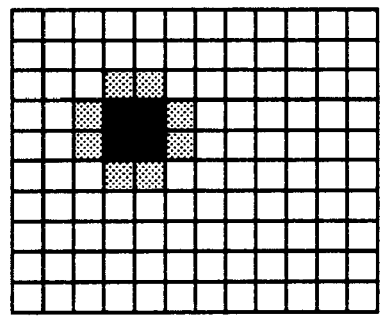
Figure 8C:
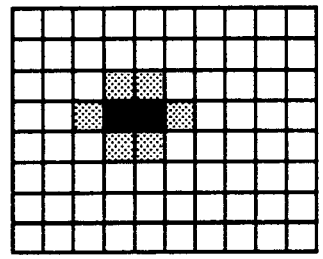
Figure 8D:
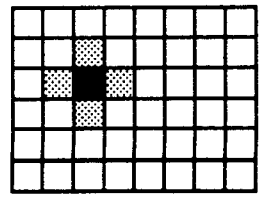

A signal frequency whose gain is limited is $f_1$ in FIG. 6A, $f_2$ in FIG. 6B, $f_3$ in FIG. 6C, and $f_4$ in FIG. 6D. Here, it is assumed that $f_1 > f_2 > f_3 > f_4$. Thus, signal frequency components are successively limited starting at the higher frequency. In a case when this signal is a video signal, signal components expressing fine parts of a picture are successively reduced and as the data amount is decreased, the picture sharpness is deteriorated from FIG. 6A toward FIG. 6D.

FIG. 7 shows a method of compression ratio switching of a video signal by changing a number of blocks constituting a screen, i.e., by changing the resolution. From FIG. 7A toward FIG. 7D, the number of blocks constituting a screen is decreased, lowering the resolution. Thus, a data amount required for one screen is reduced and the signal is substantially compressed.

FIG. 8 shows a method for compression ratio switching by changing the display image. From FIG. 8A toward FIG. 8D, the size of one screen image is decreased. In FIG. 8A to FIG. 8D, although the size of a block constituting the screen is identical, the number of blocks constituting a screen is reduced. Thus, a necessary data amount is decreased and the signal is substantially compressed.

Actually, there is often a case when it is not necessary to reproduce a picture at a predetermined full size according to the contents of the program. By utilizing this, it is possible to substantially compress the video signal data amount. For example, by reducing the vertical and horizontal sizes of the picture of the long time mode into half, it is possible to reduce the necessary data amount to ¼.

Moreover, when an object in the picture does not move much, it is possible to reduce the number of frames per a unit time less than specified in a predetermined video signal specification (for example, 30 frames/second) without significantly deteriorating the view. By detecting a picture motion, it is possible to adjust the number of frames so as to change the compression ratio.

FIG. 9 schematically shows a method to change the compression ratio by changing the number of frames per a unit time. Here, for simplification of the explanation, it is assumed that one screen consists of 7 frames per a unit time.

FIG. 9A shows 7 frames of Frame 91 to Frame 97 arranged within the aforementioned unit time so as to constitute one screen. Here, a black circle in the frames shows an object moving from left to right in the screen.

In FIG. 9B, two frames of Frame 93 and Frame 96 are removed from the aforementioned 7 frames, and the remaining 5 frames are arranged at an identical time interval within the aforementioned unit time. Here, frame 92a may be frame 92 or frame 93 as they are. However, it is more preferable to create frame 92a by the average processing or interpolation processing between frame 92 and frame 93. The same applies to frame 95a. With this operation, the video signal is compressed to 5/7.

In FIG. 9C, three frames of frame 92, frame 94, and frame 96 are removed from the aforementioned 7 frames, and the remaining 4 frames are arranged within the unit time. With this operation, the video signal is compressed to 4/7.

In FIG. 9D, four frames of frame 92, frame 93, frame 95, and frame 96 are removed from the aforementioned 7 frames, and the remaining 3 frames are arranged within the unit time. With this operation, the video signal is compressed to 3/7.

Thus, it is possible to change the compression ratio by changing the number of frames to be removed from the frames constituting one screen of a video signal per a unit time. Here, as the frame removal (thinning) value increases, the compression ratio is increased. It should be noted that in a space created by removal of a frame, the old frame is retained.

In the aforementioned high quality picture mode and in the long time mode, the thinning ratio is changed to control the compression ratio. In the long time mode having a greater compression ratio, the thinning ratio is increased.

FIG. 10 schematically shows the aforementioned methods of variable rate recording in the long time recording mode, so as to change the compression ratio of a digital signal according to an empty capacity of the recording medium and the recording time. Here, the compression ratio is continuously changed according to the time, but as has been described above, the compression ratio is practically switched between several steps.

Figure 10A:
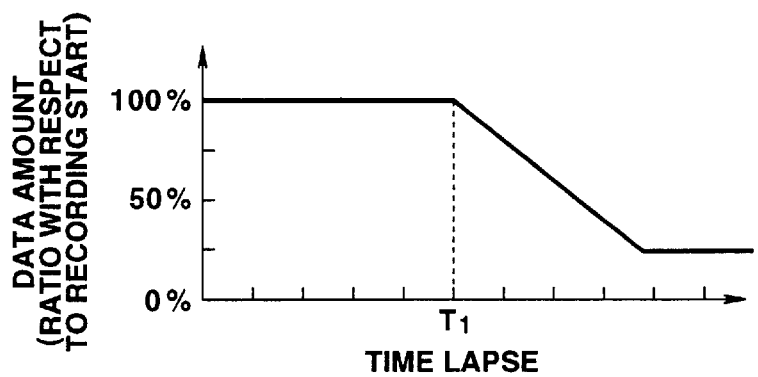
FIGS. 10A–10D shows a signal data amount controlled according to the time of recording onto a recording medium.
Figure 10B:
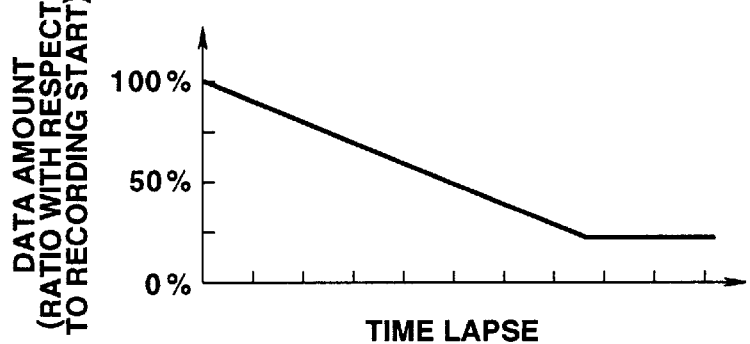
Figure 10C:
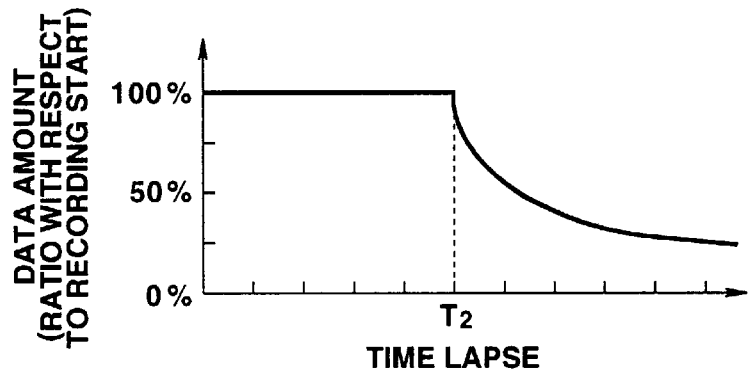
Figure 10D:
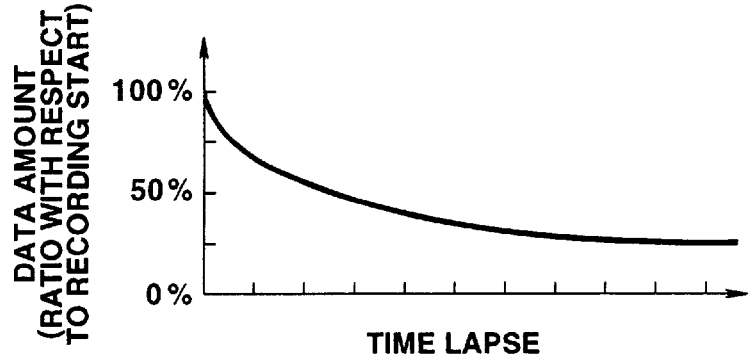

In the present embodiment, as shown in FIG. 10A, after a time lapse of T1 from the recording start, the compression ratio is changed linearly, but as shown in FIG. 10B, it is also possible to linearly change the compression ratio from the recording start. Moreover, as shown in FIG. 10C, it is also possible that after a time lapse T2 from the recording start, the compression ratio is changed by using a non-linear function such as a fractional function, exponential function, and logarithmic function, or as shown in FIG. 10D, it is also to change the compression ratio in a curve from the recording start.

It should be noted that when the aforementioned compression ratio controls are carried out, as the data compression ratio is increased, the transfer rate is also increased. for this, it is preferable that the maximum compression ratio be such that a data amount is compressed to 20% of the data amount at the recording start.

In the present embodiment, the aforementioned methods for changing the recording bit rate can be used in combination according to the necessity. Furthermore, it is also possible to employ zone encoding for substantially increasing the compression ratio. That is, in a screen consisting of a digital signal inputted, the number of bits allocated for the peripheral portion is decreased more than the decrease of the allocated bits for the center portion. This is based on the following. In the long time mode, the compression ratio is comparatively high and the reproduction signal bit rate is lowered, often causing block distortion and mosquito noise. To cope with this, more bits are allocated for the screen center portion where more important contents are normally displayed than the screen peripheral portion.

Next, description will be directed to the digital signal reproduction method and apparatus according to an embodiment of the present invention.

Figure 11:
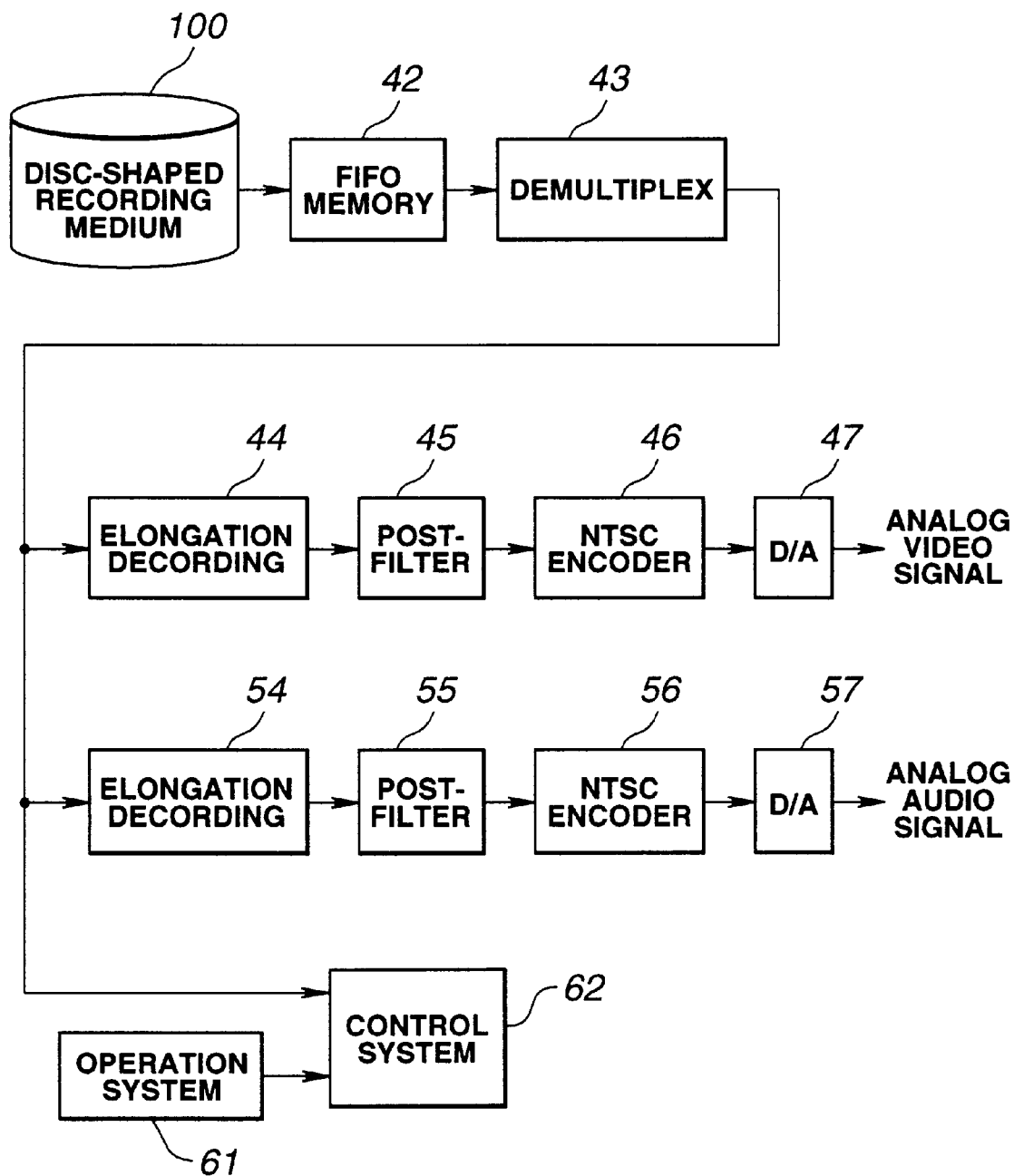
FIG. 11 is a block diagram showing a configuration example of a digital signal reproduction apparatus according to the present invention which corresponds to the digital signal recording apparatus of FIG. 1.

FIG. 11 is a block diagram showing a configuration example of the digital signal reproduction apparatus which corresponds to the digital signal recording apparatus shown in FIG. 1. This digital signal reproduction apparatus is for reproducing a digital signal such as a video signal and an audio signal which have been compressed in the aforementioned high quality picture mode or the long time mode before being recorded on the disc-shaped recording medium 100. In this digital signal reproduction apparatus, those components common to the components in the digital signal recording apparatus of FIG. 1 are denoted with the identical symbols.

A compressed digital signal such as a video signal which is read out from the disc-shaped recording medium 100 by predetermined read-out means is accumulated in the FIFO memory 42 so as to be converted into a continuous data, and the signal is dissolved in a demultiplex circuit 42 into a video signal, audio signal, and accompanying data. This accompanying data is a control signal including a high quality picture/long zime mode switching signal. It should be noted that the aforementioned read-out means is identical to a conventional one and its explanation will be omitted.

The video signal isolated in the demultiplex circuit 43 is decoded from the compressed state by a compression decoding circuit 44 serving as decoding means and is subjected to pre-filtering by in a post-filter 45 using a parameter selected according to the high quality picture/long time mode switching signal. The signal is further encoded by an NTSC encoder 46 and converted by a D/A converter 47 into an analog video signal for output.

On the other hand, the audio signal which has been isolated in the demultiplex circuit 43 is decoded from the compressed state by a compression decoding circuit 54 and subjected to filtering by a post-filter 55 using a parameter selected according to the high quality picture/long time mode switching signal. The signal is further encoded by an NTSC encoder 56 and converted by a D/A converter 57 into an analog audio signal for output.

It should be noted that FIG. 11 shows a configuration example for a case when the video signal is based on the signal specification of the NTCS method. However, it is also possible to employ a video signal specification other than the NTSC method such as the PAL method and the SECAM method. In such a case, the NTSC encoders 46 and 56 are replace by encoders satisfying the video signal specifications.

Figure 12:
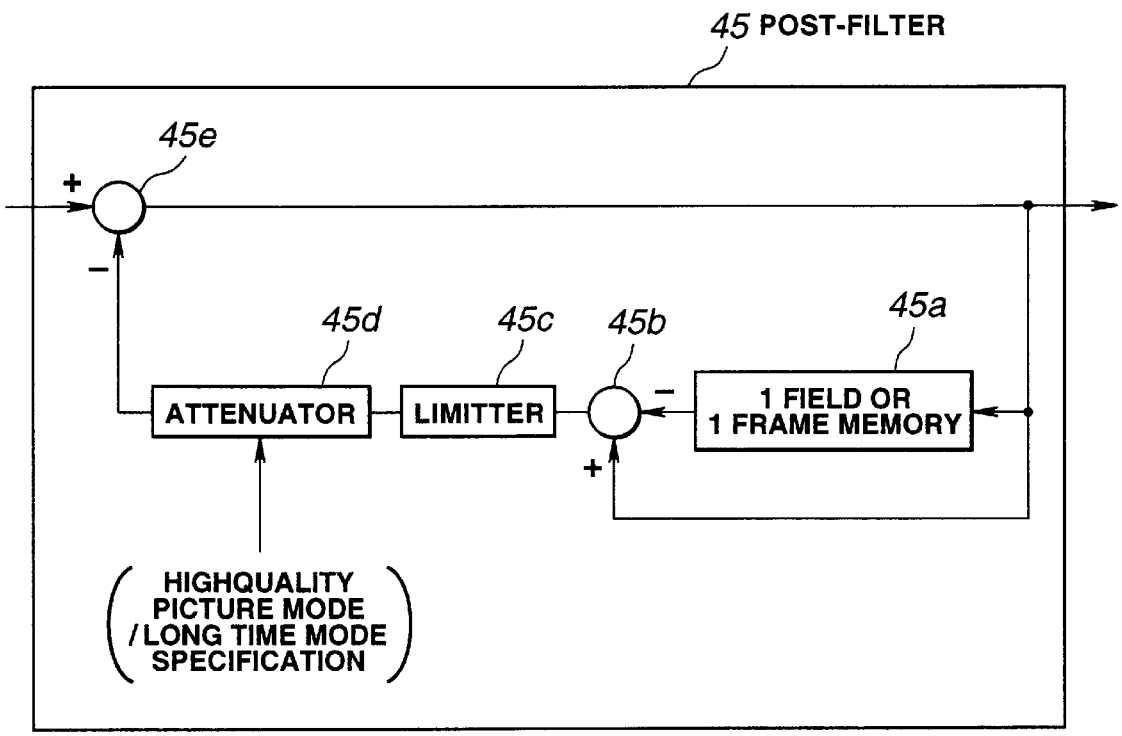
FIG. 12 is a block diagram showing a configuration example of a post-filter 45 of FIG. 11.

FIG. 12 is a block diagram showing a configuration example of the post-filter 45 in FIG. 11.

In the long time mode, the compression ratio of a video signal is set to a comparatively high value in order to prolong the time available for recording the video signal on the disc-shaped recording medium 100. For this, a block distortion may remain in the picture reproduced. This block distortion may be reduced by filtering with the post-filter 45 during reproduction. Here, in the field noise reduction (FNR) for carrying out noise reduction for each of the fields of a video signal, there is such a method that when a difference between fields which are continuous in time is less than a certain value, subtraction is carried out so as to reduce the difference, thus eliminating that the block distortion is greatly changed between fields, deteriorating the view of the picture reproduced. This method has been implemented in practice.

More specifically, a video signal of one field or one frame decoded by a compression decoding circuit 44 is accumulated in a memory 45a and is subtracted from the next one field or one frame of video signal in a differential circuit 45b so as to obtain a difference. This difference is limited to a certain value or below by a limitter circuit 45c and is supplied via an attenuator 45d to a differential circuit 45e. The attenuation amount of this attenuator 45d is controlled according to the high quality picture/long time mode switching signal. In the differential circuit 45e, the difference from the attenuator 45e is subtracted from a video signal supplied from the compression decoding circuit 44 for output to the NTSC encoder 46. Thus, the block distortion during reproduction can be reduced.

It should be noted that in the present embodiment, in the high quality picture mode, such setting is already made that block distortion cannot easily appear, and accordingly, this FNR is weakly carried out or not carried out at all. This is because the picture which has been subjected to the FNR may deteriorate its fine parts when subjected to pan/tilt.

By the way, when a movie or the like having a high authorship value is recorded as a digital signal, it is considered that the recording is normally carried out in the high quality picture mode so as to obtain a superior picture quality. Private copying of such a work of high picture quality should be inhibited or limited by charging a relevant fee.

Consequently, when a signal recorded on the high quality picture mode on the disc-shaped recording medium 100 is copied in the high quality picture mode onto another apparatus or recording medium, it is preferable that the copying itself be inhibited or the number of copying operations should be limited or charged with a high price. On the contrary, when copying is carried out in the long time mode with a slightly lowered picture quality, it is preferable that the aforementioned limit be mitigated, charging a lower price.

In the digital signal recording method and apparatus according to the present invention, a digital signal is compressed with a compression ratio specified from a plurality of compression ratios by a control signal and accordingly, it is possible to record a video signal in the high quality picture mode and in the long time mode having different compression ratios on one disc-shaped recording medium capable of recording a video signal.

Moreover, in the digital signal reproduction method and apparatus according to the present invention, the aforementioned digital signal recording method and apparatus are used to reproduce a digital signal recorded with different compression ratios on one disc-shaped recording medium and the signal is subjected to a processing to reduce a block distortion according to the respective compression ratios before being output. Consequently, it is possible to reproduce with a practical picture quality even a video signal recorded in the long time mode with a high compression ratio.

When the aforementioned are used for carrying out a recording/reproduction using a disc-shaped recording medium having a superior random access capability than a magnetic tape and capable of recording/reproduction of a high picture quality, it is possible to select a high quality picture mode and long time mode which respectively correspond to the standard mode and the long time mode in a VTR. Thus, according to the contents of a signal to be recorded, it is possible to selectively use the high quality picture mode laying stress on the picture quality admitting a short recording time and the long time mode laying stress on a long recording time admitting deterioration of the picture quality.

What is claimed is:

1. A digital signal recording method for compressing and recording a digital signal onto a randomly accessible recording medium, said method comprising:

a compression step for compressing a digital signal input with a compression ratio specified by a control signal from a plurality of compression ratios;

an accumulation step for accumulating the compressed digital signal in a memory; and a recording step for recording the accumulated digital signal in a recording area of said recording medium.

2. A digital signal recording method as claimed in claim 1, wherein the digital signal is recorded with a fixed rate on the recording medium if a first mode is set to specify a first compression ratio from said plurality of compression ratios and the digital signal is recorded with a variable rate on the recording medium if a second mode is set to specify a second compression ratio which is higher than said first compression ratio.

3. A digital signal recording method as claimed in claim 2, wherein said recording medium has a recording area where the digital signal is recorded in the first mode and a recording area where the digital signal is recorded in the second mode which areas are respectively specified according to said compression ratios.

4. A digital signal recording method as claimed in claim 2, wherein said recording medium is a disc-shaped recording medium having a first recording area provided on the outer circumferential side and a second recording area provided on the inner circumferential side and a digital signal is recorded on said first recording area if a first mode is set and on said second recording area if a second mode is set.

5. A digital signal recording method as claimed in claim 2, wherein a sampling frequency of the digital signal in said second mode is lower than a sampling frequency of the digital signal in said first mode.

6. A digital signal recording method as claimed in claim 2, wherein the maximum frequency of the digital signal in said second mode is lower than the maximum frequency of the digital signal in said first mode.

7. A digital signal recording method as claimed in claim 2, wherein the number of screens successively constituted per a unit time by the digital signal in said second mode is smaller than the number of screens successively constituted within the unit time by the digital signal in said first mode.

8. A digital signal recording method as claimed in claim 2, wherein the number of pixels constituting a screen with the digital signal in said second mode is smaller than the number of pixels constituting a screen with the digital signal in said first mode.

9. A digital signal recording method as claimed in claim 2, wherein the screen constituted by the digital signal in said second mode has a smaller size than the screen constituted by the digital signal in said first mode.

10. A digital signal recording method as claimed in claim 2, wherein in said second mode, reduction in allocation bits for the periphery portion of a screen constituted by the digital signal is carried out with a higher priority than for the center portion of the screen.

11. A digital signal recording apparatus comprising:
   compression means for compressing a digital signal with a compression ratio specified by a control signal from a plurality of compression ratios;
   a memory for accumulating the compressed digital signal; and
   recording means for recording the accumulated digital signal in a recording area specified according to said compression ratio from a plurality of recording areas on a recording medium.

12. A digital signal recording apparatus as claimed in claim 11, said apparatus further comprising complexity detecting means for detecting a complexity of said digital signal so that the compression ratio of said digital signal is switched according to the complexity detected.

13. A digital signal recording apparatus as claimed in claim 11, wherein said compression means switches the compression ratio according to signal specifications of an input signal and an accompanying data indicating the contents of the input signal.

14. A digital signal recording apparatus as claimed in claim 11, wherein said recording medium is a disc-shaped recording medium having a first recording area on a inner circumeferential side for recording a digital signal and a second recording area on a outer circumferential side for recording a digital signal of a lower compression ratio than the digital signal recorded on said first recording area.

15. A digital signal reproduction method for reproducing a compressed digital signal recording on a randomly accessible recording medium, said method comprising:
   a read-out step for reading out a digital signal of a compression ratio which varies depending on recording areas of said recording medium;
   an accumulation step for accumulating the read-out digital signal in a memory; and
   a demodulation step for demodulating the accumulated digital signal.

16. A digital signal reproducing method as claimed in claim 15, wherein said recording medium is a disc-shaped recording medium.

17. A digital signal reproduction apparatus comprising:
   read-out means for reading out digital signals recorded with different compression ratios in different recording areas of a randomly accessible recording medium;
   memory for accumulating the read-out digital signal; and
   decoding means for decoding the accumulated digital signal.

18. A digital signal reproduction apparatus as claimed in claim 17, wherein said decoding means includes:
   a memory for accumulating a past picture constituted by a digital signal;
   a differential circuit for obtaining differential video signal between a current picture constituted by the video signal and said accumulated past picture;
   signal limit means for limiting a frequency band and an amplitude of said differential video signal; and
   a filter having subtraction means for subtracting the signal having the limited frequency band and amplitude from a digital signal which has been decoded according to the compression ratio.

19. A digital signal reproduction apparatus as claimed in claim 17, wherein said recording medium is a disc-shaped recording medium.

* * * * *